UNITED STATES PATENT OFFICE.

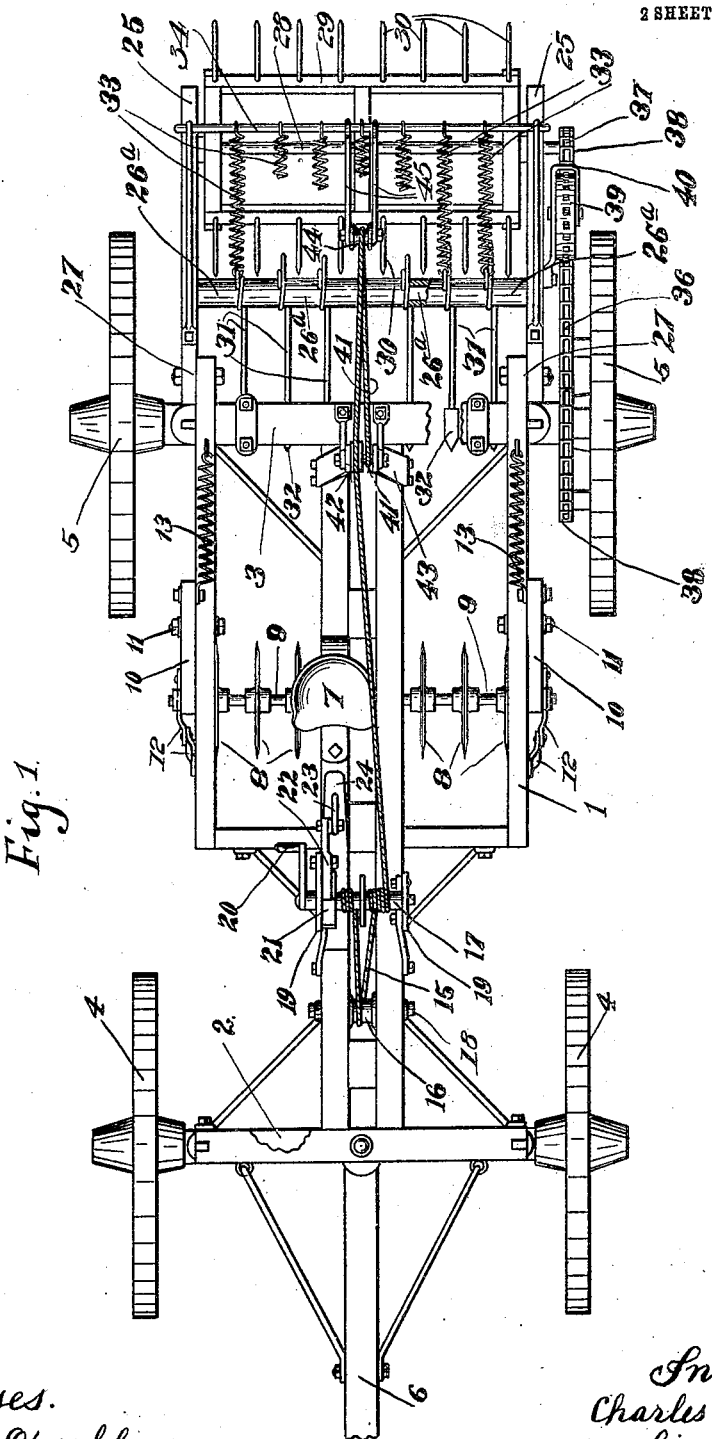

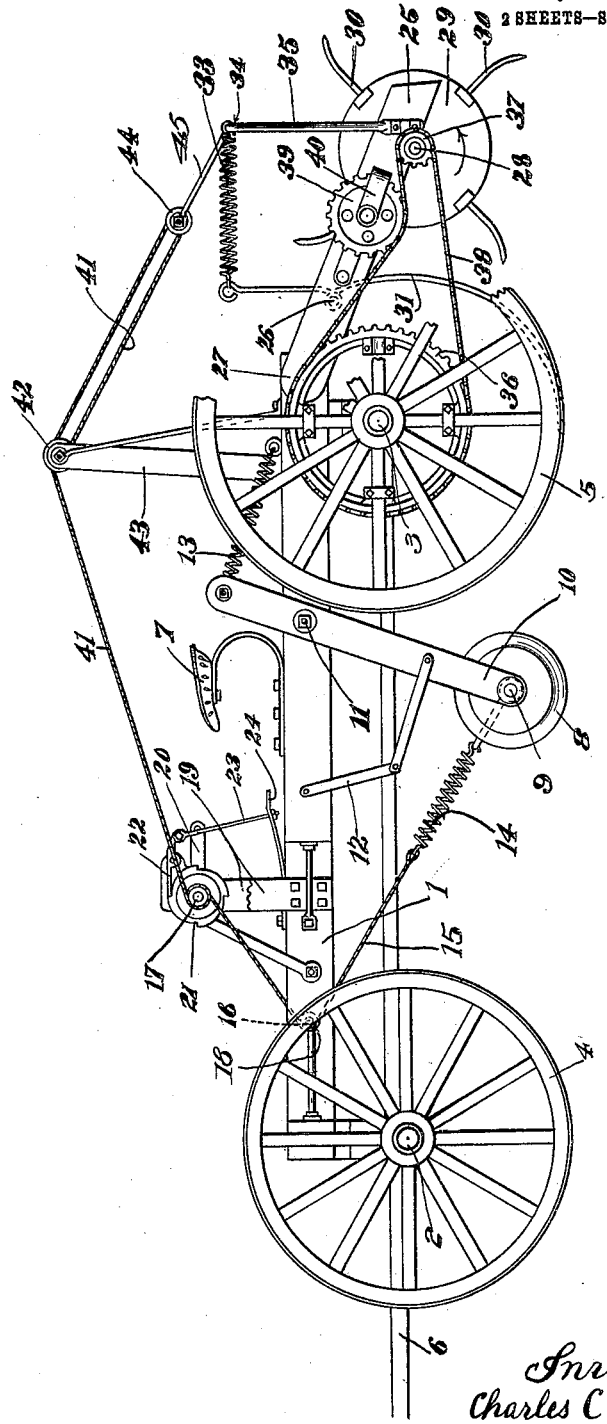

CHARLES C. NELSON, OF LAFAYETTE, MINNESOTA.

QUACK-GRASS DESTROYER.

No. 922,178.  Specification of Letters Patent.  Patented May 18, 1909.

Application filed November 9, 1908. Serial No. 461,620.

*To all whom it may concern:*

Be it known that I, CHARLES C. NELSON, a citizen of the United States, residing at Lafayette, in the county of Nicollet and State of Minnesota, have invented certain new and useful Improvements in Quack-Grass Destroyers; and I do hereby declare the following to be a full, clear, and exact description of the invention, such as will enable others skilled in the art to which it appertains to make and use the same.

My invention has for its object to provide an improved machine for digging up and destroying quack grass and for other analogous work, and to this end, it consists of the novel devices and combinations of devices hereinafter described and defined in the claims.

The invention is illustrated in the accompanying drawings wherein like characters indicate like parts throughout the several views.

Referring to the drawings: Figure 1 is a plan view, showing the improved machine; and Fig. 2 is a side elevation thereof, with some parts broken away.

The vehicle which carries the operative parts of the machine, comprises a skeleton frame work having a pivoted front axle 2 and a fixed axle 3 on which axle wheels 4 and 5 respectively are journaled. A pole 6 is attached to the front axle 2, and a driver's seat 7 is shown as supported from one of the longitudinal center beams of the frame work 1. A multiplicity of sharp edged disks 8 are rigidly secured to a shaft 9 that is loosely journaled in the free lower ends of a pair of supporting levers 10, that are intermediately pivoted at 11 to the side beams of the frame 1. The rearward movements of the lower ends of the levers 10 are limited by a pair of toggles 12 that connect the same to the side beams of the frame 1, as shown in Fig. 2. Coiled springs 13, as shown, are attached to the upper ends of the levers 10 and to the rear portions of the side beams of the frame 1. These springs 13, in part, counter-balance the weight of the disks 8 and its shaft 9 on the lower ends of the arms 10; but are not strong enough to raise or throw the same forward, but normally tend to hold the same approximately as shown in Fig. 2. A coiled spring 14 is attached to the central portion of the shaft 9 by means of a suitable coupling, swiveled on the said shaft. The other end of this spring 14 is connected to one end of a hoisting cable 15, that is passed over a guide sheave 16 and is attached to a windlass drum 17. The sheave 16 is shown as journaled on a supporting rod 18, fixed to the front portion of the frame 1, and the drum 17 is journaled in suitable bearing pedestals 19 fixed to the central longitudinal beams of the said frame 1. At one end, the shaft of the drum 17 is provided with an operating crank 20, and inward thereof, it is provided with a ratchet wheel 21 that is normally engaged by a lock dog 22 pivoted to an extension of one of the pedestals 19. A rod 23 connects the tail of the dog 22 to a foot lever 24, which is positioned to be engaged by the foot of the operator from the seat 7.

A supplemental frame made up of a pair of rearwardly extended levers 25 and a tie rod 26 is pivotally connected at 27 to the rear portions of the side bars of the frame 1. A shaft 28 is journaled in suitable bearings on the rearwardly extended face ends of the frame levers 25, and to this shaft a skeleton drum or cylinder 29 having teeth 30, is rigidly secured. Long lever-like plow-teeth 31 are intermediately pivoted on the tie rod 26, and are suitably spaced apart by short sleeves 26$^a$. At their lower forwardly curved ends, the teeth 31 are provided with small hoe-like blades 32, the purpose of which will presently appear. Coiled springs 33 connect the upper ends of the teeth 31 to a transverse rod 34, shown as secured to the upper ends of supporting rods 35, the lower ends of which are rigidly attached to the rear ends of the levers 25. The extreme forward position of the lower ends of the teeth 31 is indicated in the drawings.

One of the rear or traction wheels 5 is provided with a large driving sprocket 36, and the cylinder shaft 28, at one end, is provided with a small sprocket 37, over which, and the said sprocket 36, runs a sprocket chain 38. As shown, the slack of the sprocket chain 38 is adapted to be taken up by an idle sprocket 39 mounted in a bracket 40 adjustably secured to the adjacent lever 25. A second cable 41 is attached at its forward end to the drum 17, already noted, and this cable is passed rearwardly over a guide sheave 42, journaled to the upper end of the bearing pedestal 43 fixed at its lower end to the truck frame 1. From the sheave 42, the cable 41 is passed around the sheave 44, which as shown, is connected by a pair of links 45 to the intermediate portion of the rod 34, which latter, it will be remembered, is rigidly secured to the free ends of the levers 25 by the vertical rods 35. From the sheave 44, the cable 41 is brought forward and attached to the upper portion of the fixed bearing pedestal 43.

The operation of this machine is substantially as follows: When the machine is drawn forward, the toothed drum 29 will be rotated in the direction of the arrow marked thereon in Fig. 2, and, when the disks 8 are lowered into contact with the ground, they will be forced backward and downward into the ground or sod over which they travel cutting the ground or sod, into narrow strips extending in the direction of the travel of the machine. The blades or shovel ends 32 of the spring teeth 31 are, in a direction transversely of the machine, positioned midway between the disks 8 so that they will lift up the ground and quack grass or other growth contained in the strips thus loosened. The quack grass under the forward movement of the machine, will be forced rearward and upward on the curved spring teeth 31, and will be struck in rapid succession by the backwardly curved teeth 30 of the rotating drum or cylinder 29, and by this action, all dirt will be pounded from the roots of the uplifted quack grass, and this quack grass will be dropped on top of the ground where it may be subsequently raked up and burned, or allowed to lie in the sun until its roots are killed and then to disintegrate and form fertilizer for the ground.

If any of the teeth 31 should strike a stone or root, it will turn backward, and hence, will not be broken. By rotating the windlass drum 17 in the direction of the bevel of the teeth of the ratchet wheel 21, as shown in Fig. 2, the cylinder or toothed drum 29 will be raised, and simultaneously therewith, the disks 8 will be lifted out of the ground. By reverse movements of the said windlass drum, the said cylinder and disks will, of course, be lowered into operative positions.

The machine described, while simple, is efficient for the purposes had in view, and has few parts to get out of order. The machine described, while especially designed for use in the destruction of quack grass, may nevertheless, be used for other purposes, such for instance, as destroying weeds or for disintegrating sod.

What I claim is:

1. In a machine of the kind described, the combination with a rotary toothed cylinder, of blade-equipped uplifting teeth located in front of said cylinder, and a plurality of cutting disks located in front of said blade-equipped teeth, substantially as described.

2. In a machine of the kind described, the combination with a truck, of a supplemental frame pivotally connected thereto, a toothed cylinder journaled on said supplemental frame, a plurality of uplifting teeth located on said supplemental frame in front of said cylinder, a disk support pivotally connected to the truck frame in front of said uplifting teeth, a plurality of cutting disks mounted on the lower portions of said disk supports, and means operative, at will, for raising and lowering said supplemental frame and said disk support, substantially as described.

3. In a machine of the kind described, the combination with a truck, of a rearwardly extended supplemental frame, pivotally connected to the rear portion of the truck frame, a toothed cylinder mounted on said supplemental frame and driven from one of the wheels of said truck, a plurality of curved blade-equipped uplifting teeth spring mounted on said supplemental frame in front of said cylinder, means for raising and lowering said supplemental frame, a disk support pivotally connected to the truck frame in front of said uplifting teeth, a plurality of cutting disks mounted on the lower portions of said disk supports, and means for raising and lowering the said disk support, substantially as described.

4. In a machine of the kind described, the combination with a rearwardly extended supplemental frame pivotally connected to the rear portion of said truck frame, a toothed cylinder mounted on said supplemental frame and driven from one of the rear wheels of said truck, a plurality of curved blade-equipped uplifting teeth spring mounted on said supplemental frame in front of said cylinder, a pair of laterally spaced levers pivotally connected to the truck frame, a plurality of cutting disks supported by the lower ends of said levers and located in front of said uplifting teeth, toggle acting stops for limiting the rearward movements of said disk supporting levers, and a windlass shaft with cable connections for simultaneously raising and simultaneously lowering said supplemental frame and said disk supporting levers, substantially as described.

In testimony whereof I affix my signature in presence of two witnesses.

CHARLES C. NELSON.

Witnesses:
P. A. RETRUM,
JOSEPH H. BREY.